(12) United States Patent
Ashjaee et al.

(10) Patent No.: US 8,717,233 B2
(45) Date of Patent: May 6, 2014

(54) SATELLITE SIGNAL MULTIPATH MITIGATION IN GNSS DEVICES

(75) Inventors: Javad Ashjaee, Saratoga, CA (US); Mikhail Gribkov, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 176 days.

(21) Appl. No.: 13/301,633

(22) Filed: Nov. 21, 2011

(65) Prior Publication Data

US 2012/0293365 A1    Nov. 22, 2012

Related U.S. Application Data

(60) Provisional application No. 61/417,209, filed on Nov. 24, 2010.

(51) Int. Cl.
*G01S 19/42* (2010.01)
*G01S 19/22* (2010.01)

(52) U.S. Cl.
USPC ................................ 342/357.25; 342/357.61

(58) Field of Classification Search
USPC ........... 342/357.21, 357.25, 357.61; 701/468, 701/469, 478.5
See application file for complete search history.

(56) References Cited

U.S. PATENT DOCUMENTS

| | | |
|---|---|---|
| 2008/0208454 A1 | 8/2008 | Pesterev et al. |
| 2009/0189804 A1 | 7/2009 | Ashjaee et al. |
| 2010/0176992 A1 | 7/2010 | T'Siobbel |
| 2011/0075886 A1 | 3/2011 | Ashjaee et al. |

FOREIGN PATENT DOCUMENTS

EP    2216657 A1    8/2010

OTHER PUBLICATIONS

Office Action received for European Patent Application No. 11189982.9, mailed on Jan. 3, 2013, 3 pages.
Extended European Search Report received for European Patent Application No. 11189982.9, mailed on Mar. 16, 2012, 7 pages.
Meguro et al., "GPS Accuracy Improvement by Satellite Selection Using Omnidirectional Infrared Camera", IEEE/RSJ International Conference on Intelligent Robots and Systems, Acropolis Convention Center, Nice, France, Sep. 22-26, 2008, pp. 1804-1810.

*Primary Examiner* — Dao Phan
(74) *Attorney, Agent, or Firm* — Morrison & Foerster LLP (57) ABSTRACT

A method for mitigating the effects of multipath errors in GNSS devices is provided. Signals from GNSS satellites are received. Image data from an image sensor is received. Orientation data from an orientation sensor is received. The orientation data describes the orientation of the image sensor. Obstruction data is determined based on the image data. The obstruction data includes an obstruction region that indicates the sky in that region is obstructed by a structure. Based on the orientation data, obstruction data, and GNSS satellite location data, the position of GNSS satellites with respect to the obstruction region is determined. The location of the GNSS device is determined based on signals from some of the GNSS satellites and the position of GNSS satellites with respect to the obstruction region.

12 Claims, 10 Drawing Sheets

SATELLITE SIGNAL MULTIPATH MITIGATION IN GNSS DEVICES

CROSS-REFERENCE TO RELATED APPLICATIONS

This application claims the benefit of U.S. Provisional Application No. 61/417,209, filed Nov. 24, 2010, which is incorporated by reference herein.

BACKGROUND

1. Field

The present invention relates to mitigating the effects of multipath error from indirect satellite signals in Global Navigation Satellite System (GNSS) devices.

2. Related Art

Navigation receivers that use global navigation satellite systems, such as GPS or GLONASS (hereinafter collectively referred to as "GNSS"), enable a highly accurate determination of the position of the receiver. The satellite signals may comprise carrier harmonic signals that are modulated by pseudo-random binary codes and which, on the receive side, may be used to measure the delay relative to a local reference clock. These delay measurements are used to determine the pseudo-ranges between the receiver and the satellites. The pseudo-ranges are not true geometric ranges because the receiver's local clock is different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

Positioning accuracy of GNSS technology is directly dependent on the accuracy of the delay measurements. A well known source of measurement error is due to multipath error. Multipath errors are caused by reflection of the radio signal from surfaces located near the receiving antenna. The antenna receives both the direct signal running the shortest path from the satellite to the receiver and the reflected signals following indirect paths. The combination of two (or more) signals at the antenna leads to the distortion of raw measurements. Multipath errors affect both pseudo-range and carrier phase measurements. The spatial correlation of multipath depends on the location of the reflection surface relative to the antenna. For surfaces generating reflections arriving at the upper side of the antenna, the carrier phase multipath may be substantially uncorrelated for antennas located only decimeters away.

A more detailed description of determining a location based on signals from GNSS satellites and potential errors associated with those signals is available in U.S. patent application Ser. No. 12/070,333, filed Feb. 15, 2008, and No. 12/360,808, filed Jan. 27, 2009, assigned to the assignee of the present invention, and each of which are incorporated herein by reference in their entirety for all purposes.

Therefore, a high precision, portable, complete handheld GNSS device that mitigates the effects of multipath errors is desired.

BRIEF SUMMARY

Signals from GNSS satellites are received. Image data from an image sensor is received. Orientation data from an orientation sensor is received. The orientation data describes the orientation of the image sensor. Obstruction data is determined based on the image data. The obstruction data includes an obstruction region that indicates the sky in that region is obstructed by a structure. Based on the orientation data, obstruction data, and GNSS satellite location data, the position of GNSS satellites with respect to the obstruction region is determined. The location of the GNSS device is determined based on signals from some of the GNSS satellites and the position of GNSS satellites with respect to the obstruction region.

In one example, signals from satellites with positions within the obstruction region are excluded when determining the location of the GNSS device.

In another example, signals from satellites with positions with respect to the obstruction region that indicate a higher probability that signals from those satellites will be subject to multipath error as compared to non-suspect satellites

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Figure 1:
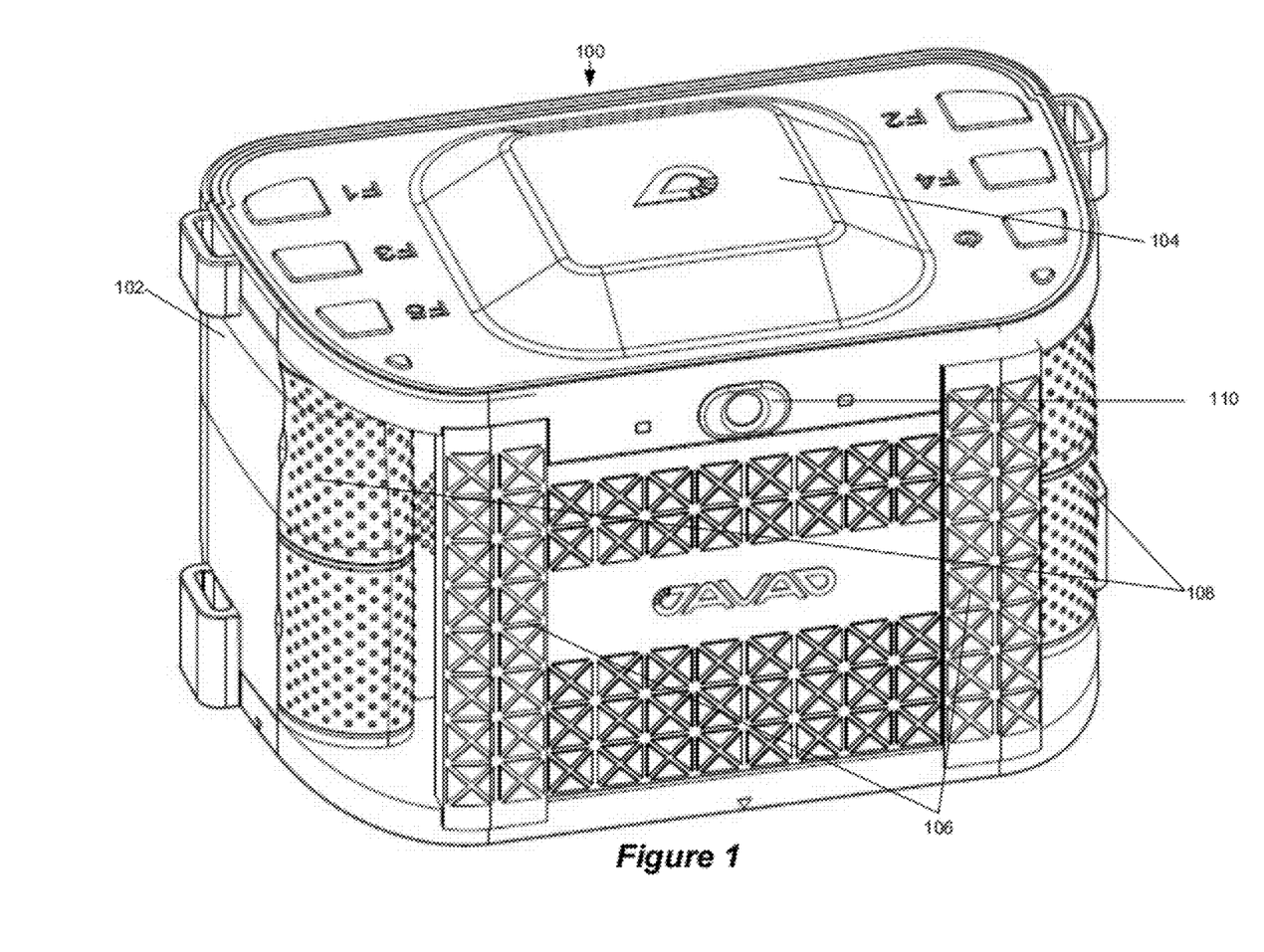
FIG. 1 illustrates a perspective view of a handheld GNSS device according to embodiments of the invention.

FIG. 1 illustrates an exemplary handheld GNSS device 100. Handheld GNSS device 100 utilizes a single housing 102. Several GNSS elements are integral to the housing 102 in that they are within the housing or securely mounted thereto. A securely mounted element may be removable. Housing 102 allows the user to hold the handheld GNSS device 100 similar to the way one would hold a typical camera. In one example, the housing 102 may include GNSS antenna cover 104 to cover a GNSS antenna 402 (shown in exemplary exploded view in FIG. 4) which may receive signals transmitted by a plurality of GNSS satellites and used by handheld GNSS device 100 to determine position. The GNSS antenna 402 is integral with the housing 102 in that it resides in the housing 102 under the GNSS antenna cover 104.

In one example, GNSS antenna 402 may receive signals transmitted by at least four GNSS satellites. In the example shown by FIG. 1, GNSS antenna cover 104 is located on the top side of handheld GNSS device 100.

Handheld GNSS device 100 may further include at least one handgrip 108. In the example shown in FIG. 1, two handgrips 108 are integral to the housing 102. The handgrips 108 may be covered with a rubber material for comfort and to reduce slippage of a user's hands.

A front camera lens 110 is located on the front side of the handheld GNSS device 100. An image sensor (not shown) is mounted within handheld GNSS device 100 allowing the image sensor to work with front camera lens 110 to produced image data of scenes in front of handheld GNSS device 100. A second bottom camera lens 116 may be located on the bottom side of the handheld GNSS device 100 in the example shown in FIG. 3. The camera included may be a still or video camera.

Figure 2:
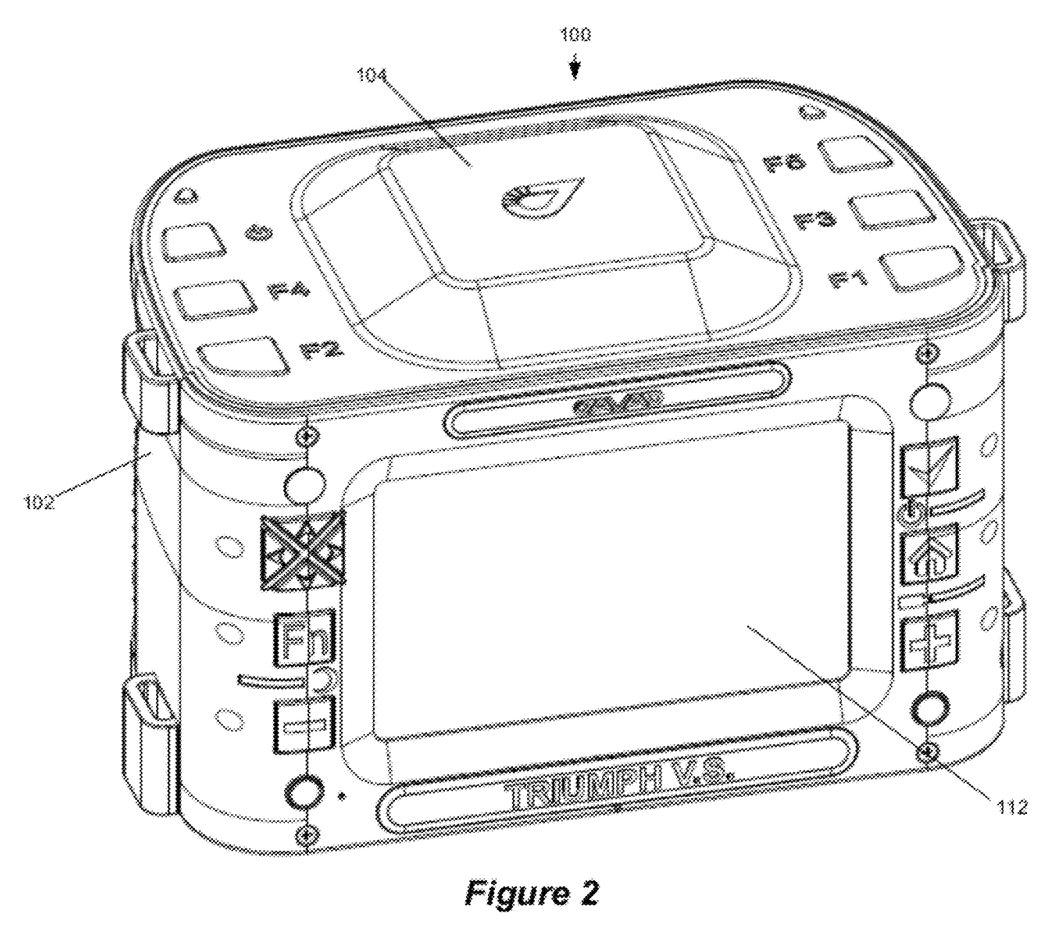
FIG. 2 illustrates another perspective view of a handheld GNSS device according to embodiments of the invention.

As shown in FIG. 2, handheld GNSS device 100 may further include display 112 for displaying information to assist the user in positioning the device. Display 112 may be any electronic display such as a liquid crystal (LCD) display, light emitting diode (LED) display, and the like. Such display devices are well-known by those of ordinary skill in the art and any such device may be used. In the example shown by FIG. 2, display 112 is integral with the back side of the housing 102 of handheld GNSS device 100.

Handheld GNSS device 100 may further include a camera for recording still images or video. Such recording devices are well-known by those of ordinary skill in the art and any such device may be used. In the example illustrated in FIG. 1, front camera lens 110 is located on the front side of handheld GNSS device 100. In one example, display 112 may be used to display the output of front camera lens 110.

Figure 3:
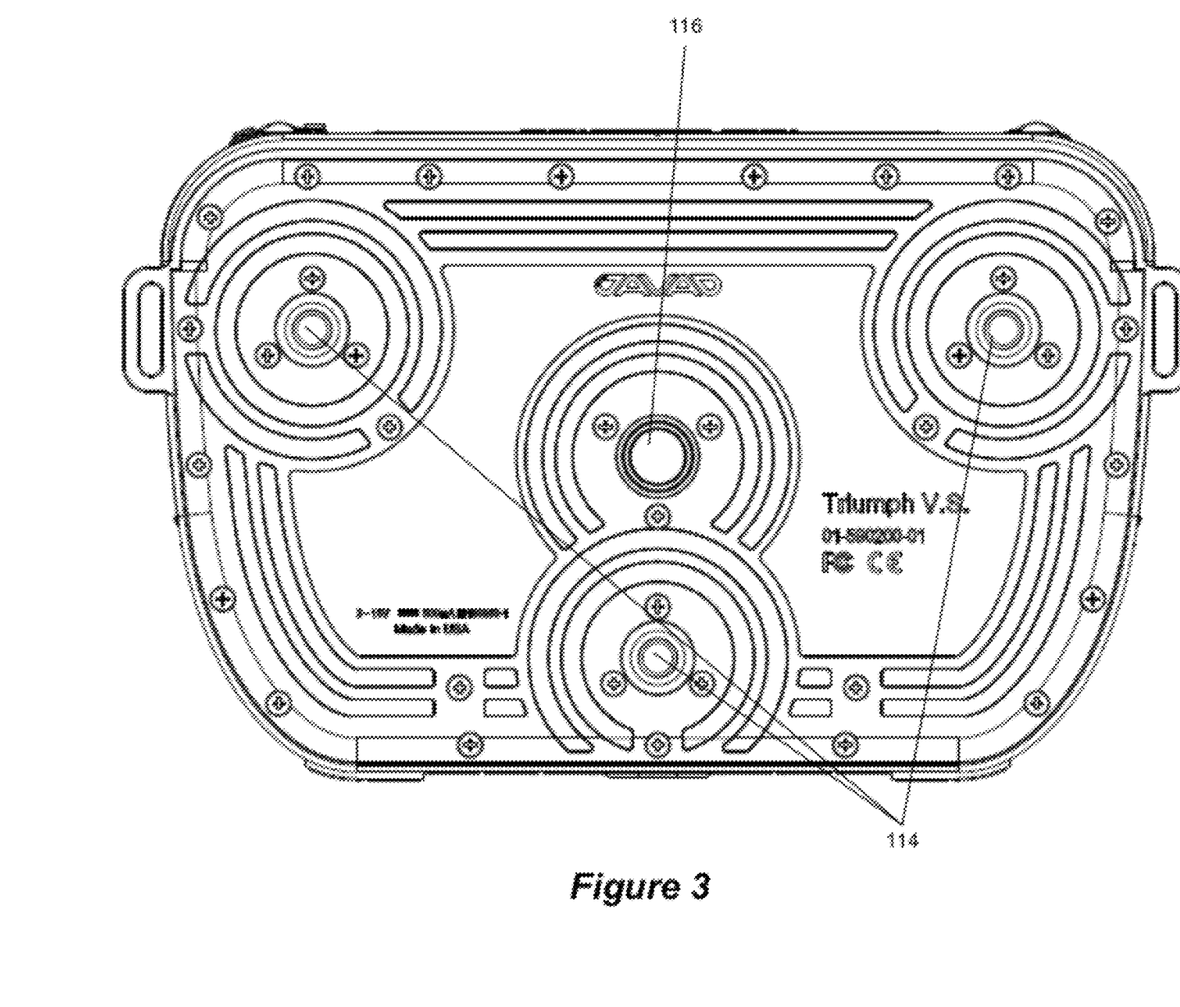
FIG. 3 illustrates another perspective view of a handheld GNSS device according to embodiments of the invention.

With reference to FIG. 3, handheld GNSS device 100 may also include a second bottom camera lens 116 on the bottom of handheld GNSS device 100 for viewing and alignment of the handheld GNSS device 100 with a point of interest marker. The image of the point of interest marker may also be recorded along with the GNSS data to ensure that the GNSS receiver 808 was mounted correctly, or compensate for misalignment later based on the recorded camera information. A description of the bottom camera lens 116 and its use to compensate for misalignment may be found in U.S. patent application Ser. No. 12/571,244, filed Sep. 30, 2009, assigned to the assignee of the present invention, and which is incorporated herein by reference in its entirety for all purposes.

Handheld GNSS device 100 may further include orientation sensors (not shown) that may include various types of sensors such as horizon sensors, MEMS gyroscopes, or magnetic compasses for generating orientation data for the device. The orientation data describes the orientation of handheld GNSS device 100 and camera lens 110 with respect to a ground plane. Orientation data may be recorded by itself or associated with various other data such as GNSS position data or image data. As discussed below, the orientation data may be used to mitigate error due to multipath satellite signals.

The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 112. The horizon sensor information, such as pitch and roll, can be recorded along with GNSS data. The horizon sensor information may be useful, for example, to later compensate for mis-leveling of the antenna.

Magnetic compasses are well-know by those of ordinary skill in the art and any such device may be used. Magnetic compasses allow determination of the magnetic direction that handheld GNSS device 100 is facing. Magnetic compass data may be recorded with a captured image. Magnetic compass data may be useful, for example, the direction of image data obtained from the front facing camera.

MEMS gyroscopes are well-know by those of ordinary skill in the art and any such device may be used. The MEMS gyroscopes allow measurement of the angular velocity of handheld GNSS device 100. Based on a starting direction from, for example, a magnetic compass, the MEMS gyroscope information may be used to determine the direction that the front of the device is facing. The MEMS gyroscope information may be recorded with a captured image. The MEMS gyroscope information may be used, for example, to determine the spatial relationship between two images captured by the front facing camera.

Handheld GNSS device 100 may further include a distance sensor (not shown) to measure a linear distance. The distance sensor may use any range-finding technology, such as sonar, laser, radar, infrared, and the like. Such distance sensors are well-known by those of ordinary skill in the art and any such device may be used.

FIG. 3 illustrates a bottom view of the handheld GNSS device 100 according to embodiments of the invention. The handheld GNSS device 100 may be mounted on a tripod, or some other support structure, by a mounting structure such as three threaded bushes 114, in some embodiments of the invention.

Figure 4:
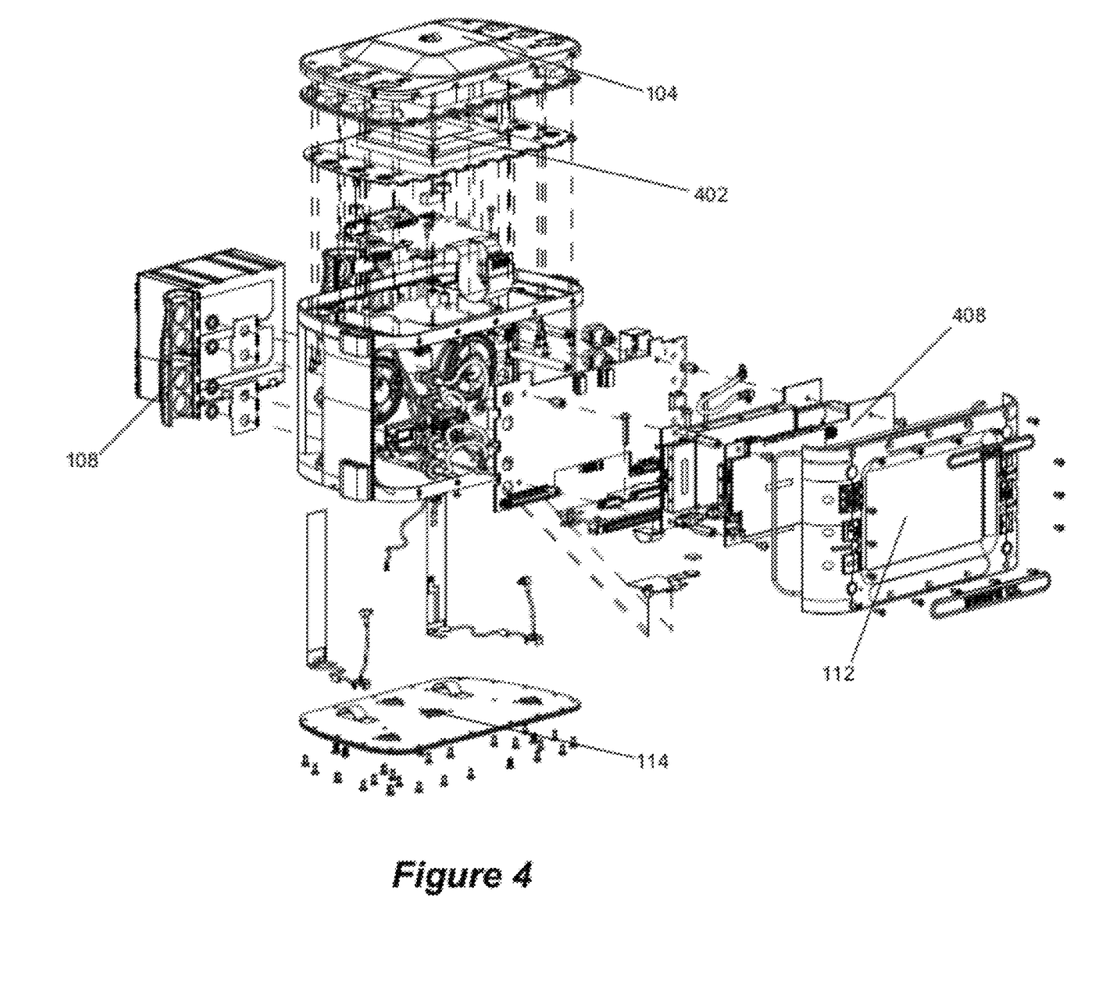
FIG. 4 illustrates an exploded view of a handheld GNSS device including a viewfinder for a camera according to embodiments of the invention.
Figure 5:
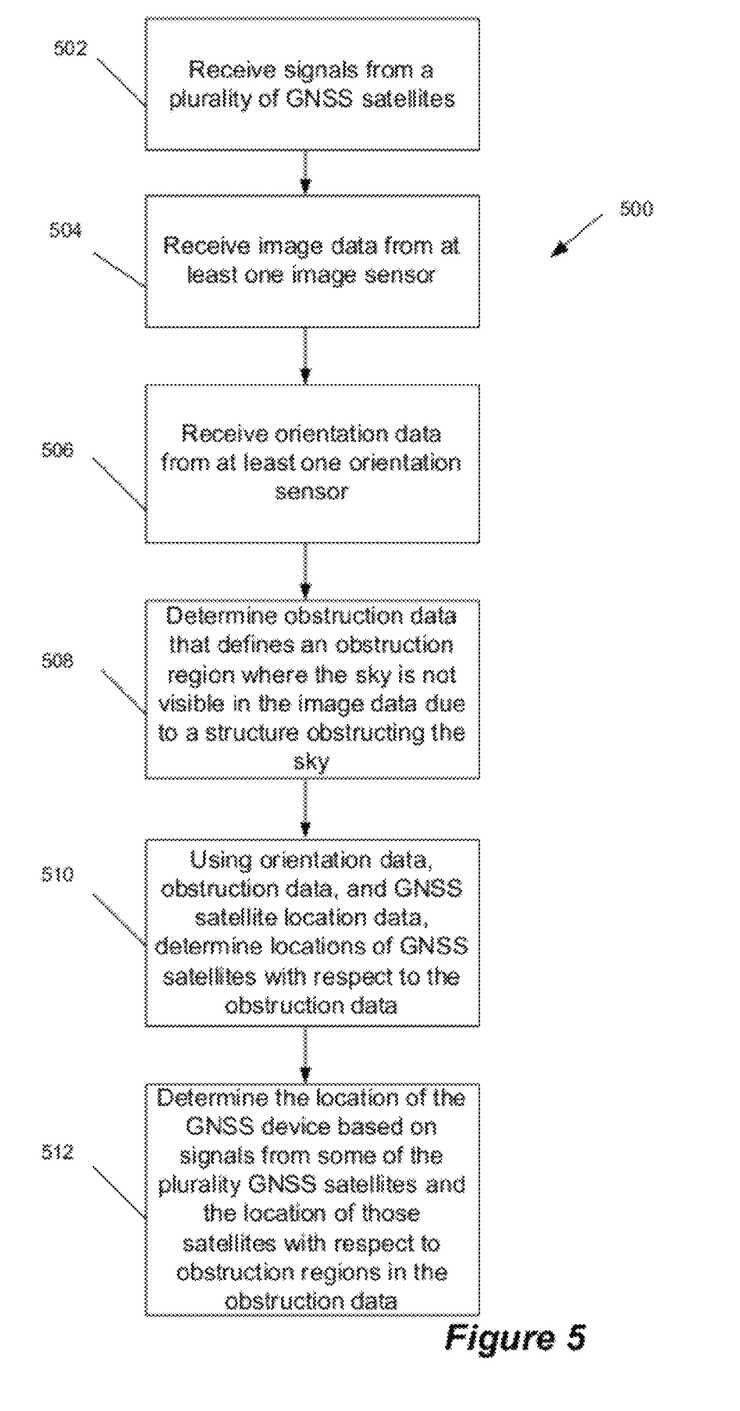
FIG. 5 illustrates a flowchart of a method for mitigating mutlipath error when determining the position of handheld GNSS device according to embodiments of the invention.

FIG. 5 illustrates an exemplary process 500 for mitigating the effects of multipath error using handheld GNSS device 100 according to embodiments of the invention. At step 502, GNSS antenna 402 and GNSS receiver 408 (FIG. 4) receive signals from a plurality of GNSS satellites. At step 504, with reference to FIG. 1, a user will position handheld GNSS device 100 such that an image sensor, such as the sensor mounted for use with front camera lens 110, obtains image data of the area in front of handheld GNSS device 100. At step 506, CPU 1108 (FIG. 11) receives orientation data from an orientation sensor of handheld GNSS device 100. At step 508, CPU 1108 determines obstruction data that defines obstruction regions in the image data where structures obstruct the sky. Based on the obstruction data, the orientation data, and GNSS satellite location data, at step 510, CPU 1108 of handheld GNSS device 100 determines whether any structures represented in the obstruction data are obstructing handheld GNSS device 100's view of any satellites that are present in the field of view of the image data. At step 512, CPU 1108 determines the location of the handheld GNSS device 100 based on signals from some of the plurality of GNSS satellites and the position of those satellites relative to the obstruction region as determined in step 510. Each step of exemplary process 500 is explained in further detail below.

With reference to step 502, signals from a plurality of GNSS satellites are received by handheld GNSS device 100 through antenna 402 and GNSS receiver 408 of FIG. 4. The signals may comprise carrier harmonic signals that are modulated by pseudo-random binary codes that may be used to measure the delay relative to a local reference clock. Each satellite signal contains a unique satellite identification code that identifies the signal as coming from a particular satellite. In step 512 below, measurements of the delay in receiving some of the signals relative to a reference clock may be used to determine the location of handheld GNSS device 100.

Figure 6:
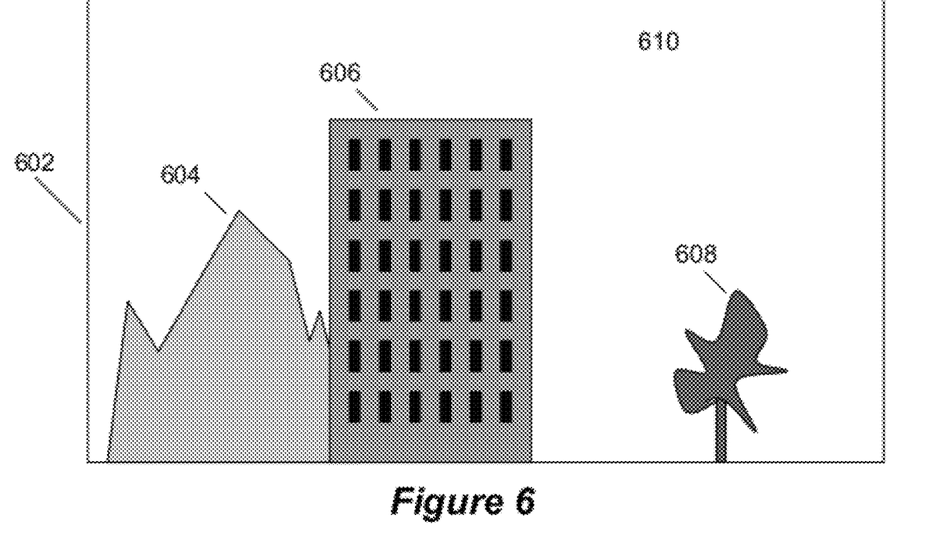
FIG. 6 depicts an image generated from image data received according to a step of a method for mitigating mutlipath error when determining the position of handheld GNSS device according to embodiments of the invention.

With reference to step 504, an image sensor, such as the sensor mounted with front camera lens 110, obtains image data that may be used to produce image 602 in FIG. 6. In this example, the image data includes data that represents mountain 604, building 606, and tree 608. The rest of the image data represents sky 610. The field of view of the image data produced by the image sensor mounted with front camera lens 110 may be obtained from the focusing and zoom settings of the lens. Alternatively, the field of view may be obtained from known fixed settings if the lens is a fixed focus and non-zoom lens. For example, the image sensor using front camera lens 110, may have a fixed field of view of 45 degrees. However other fields of view may be used.

With reference to step 506, orientation data is received from orientation sensors. The orientation data may provide enough information to determine the three dimensional orientation of handheld GNSS device 100 at the time when the image data in step 504 was obtained. For example, the orientation data may include inclination data that describes the pitch and roll of the device with respect to the horizon and magnetic direction data that describes the magnetic direction that the device is pointing.

Based on the orientation data and information about the field of view of the image data, the location in the physical world that the image data represents may be calculated. In a first example, based on the orientation data, it may be determined that image data represents data taken when the image sensor was pointed due north and inclined at 15 degrees with respect to the horizon. Based on the orientation data and the field of view of the image data, the portion of the sky and landscape that the image data represents can be calculated. In a second example, if the same image sensor is turned 45 degrees to the left and tilted up another 15 degrees, image data obtained from that position would have associated orientation data that indicated the image sensor was pointed northwest and inclined at 30 degrees with respect to the horizon. Again the portion of the sky and landscape that the image data represents may be calculated based on the orientation data and the field of view of the image data. Depending on the field of view of the image data in the first and second examples above, there may be overlap of the portions of the physical world represented by the image data at each orientation.

The portions of the sky that the image data represents may be calculated, for example, by using the field of view information with orientation data for the image sensor. Consider an example where orientation data determines that the optical axis of the image sensor is at an azimuth of 30 degrees and an elevation above the horizon of 60 degrees. Further, consider an image sensor with a fixed field of view of 45 degrees that is symmetric about the optical axis. In this example, the image data from the image sensor would represent a region of the sky from an azimuth of 7.5 to 52.5 degrees and an elevation above the horizon from 37.5 to 82.5 degrees.

If image data is needed for a larger section of the sky than is available with the field of view of the image sensor, then image data from multiple orientations of the image sensor may be stitched together using known image processing techniques. Orientation data may also aid in the stitching process by defining the spatial relationship between the image data taken at two different orientations. Using the stitching process, image data can be obtained for the entire visible sky. Alternatively, instead of stitching the image data together, the image data at each unique orientation can be processed separately according to steps 508 and 510 below.

Figure 7:
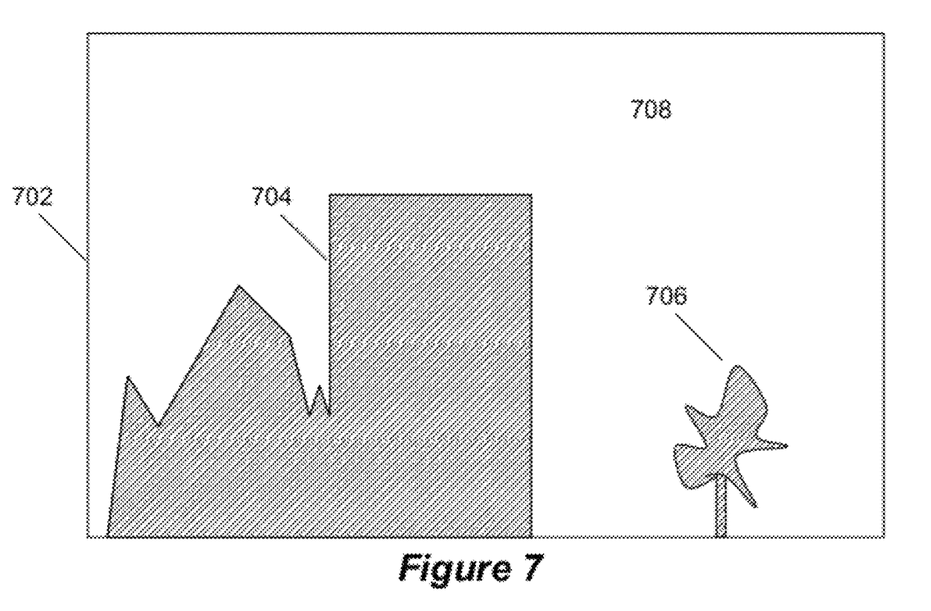
FIG. 7 depicts an image generated from obstruction data generated according to a step of a method for mitigating mutlipath error when determining the position of handheld GNSS device according to embodiments of the invention.

With reference to step 508, image processing techniques are used to determine obstruction data that defines structures present in the image data that obstruct the view of the sky. Exemplary image processing techniques for carrying out step 508 may themselves include or employ color identification, spectral analysis, infrared analysis, or edge detection. Image 702 of FIG. 7 is generated from obstruction data based on the image data used to produce image 602 of FIG. 6. The obstruction data includes obstruction region 704 that accounts for the obstruction caused by mountain 604 and building 606 as well as obstruction region 706 that accounts for the obstruction caused by tree 608. The region in the obstruction data not covered by the obstruction regions is considered unobstructed sky 708.

With reference to step 510, using the orientation data, the obstruction data, and GNSS satellite location data, the position of GNSS satellites with respect to the obstruction regions is determined. The GNSS satellite data identify the location of GNSS satellites in the sky. For example, the GNSS satellite data may include the elevation angles and azimuths of satellites in a GNSS constellation. This is information that is widely available to those of ordinary skill in the art.

As discussed with respect to step 506, the orientation data and image data field of view allows the image data to be mapped to a portion of the physical world. The orientation data enables calculation of the elevation angles and azimuths of the sky at the borders of the image data. Because the obstruction data is based on the image data and should have the same field of view as the image data, the orientation data can also be used to map the obstruction data to the physical world in the same way. Using the GNSS satellite location data that provides the satellites' locations in the physical world, positions of GNSS satellites with respect to obstruction regions may be identified in the obstruction data.

Figure 8:
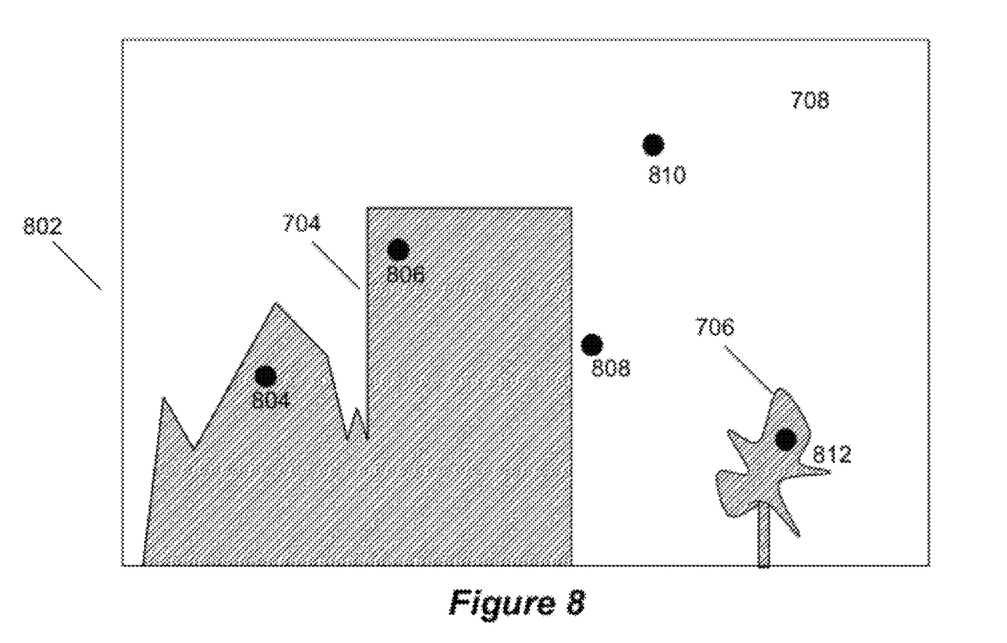
FIG. 8 depicts locations of GNSS satellites in an image generated from obstruction data generated according to a step of a method for mitigating mutlipath error when determining the position of handheld GNSS device according to embodiments of the invention.
Figure 9:
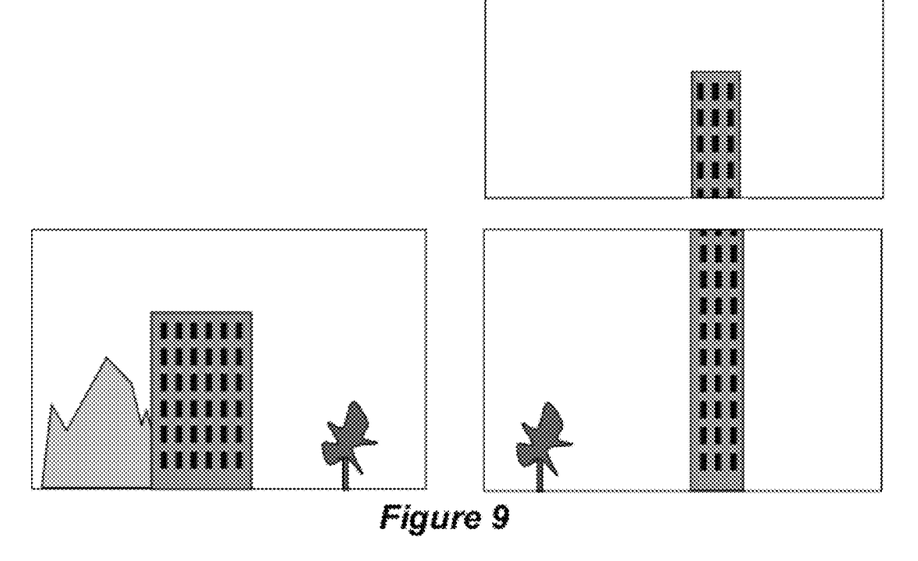
FIG. 9 depicts images generate from image data for three different orientations of a camera.
Figure 10:
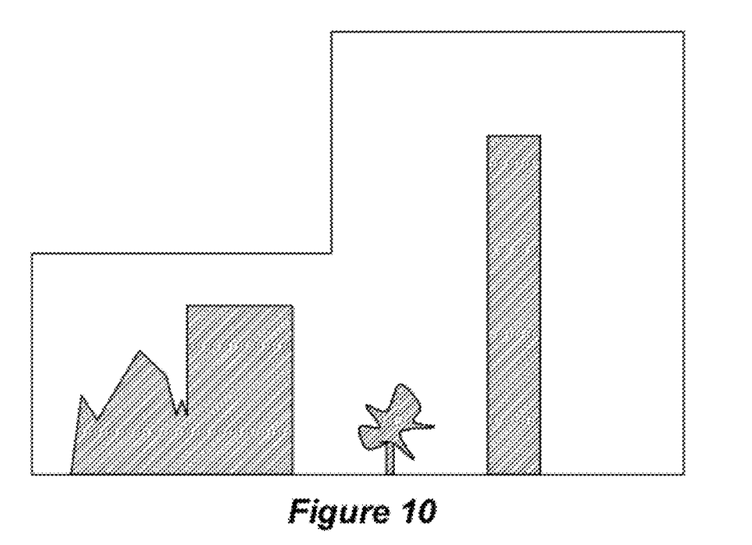
FIG. 10 depicts an image representing obstruction data generated from image data that was stitched together from image data for three orientations of a camera.

A representation of the exemplary results of step 506 is depicted in overlay 802 of FIG. 8. While such an overlay is not necessarily produced according to process 500, overlay 802 is useful for explaining step 506.

Overlay 802 has the locations of satellites 804-812 marked with solid circles. Satellite 804 is obstructed by mountain 604, satellite 806 is obstructed by building 606, and satellite 812 is obstructed by obstruction 706 caused by tree 608. These satellites may be considered obstructed satellites. Satellites 808 and 810 are not obstructed. However, based on satellite 808's proximity to obstruction region 704, it may be considered a suspect satellite because delay measurements based on signals received from this satellite may be more prone to multipath error.

With reference to step 512, the location of handheld GNSS device 100 is determined based on the signals from some of the plurality of GNSS satellites in step 502 and location of the plurality of GNSS satellites in the obstruction data as determined in step 510.

For example, if satellite signals were received from unobstructed satellites 808 and 810 as well as obstructed satellites 804, 806, and 812 in FIG. 8, the location of handheld GNSS device 100 may be determined based on the signals from satellites 808 and 810 with signals from other satellites not shown in FIG. 8 while excluding signals from obstructed satellites 804, 806, and 812.

In another example, referring to overlay 802 in FIG. 8, satellite 808's proximity to obstruction region 704 may indicate that signals from satellite 808 are more likely to be affected by multipath error than satellite 810, which is further away from the obstruction regions. Based on this determination, the signal from satellite 808 may be excluded or any delay measurement based on the signal can be de-weighted in the determination of the location of handheld GNSS device 100. De-weighting of a signal can be accomplished by devaluing the amount that measurements of that signal are used when determining the location of handheld GNSS device 100. This may be especially useful when there are signals from more than 4 satellites available, as that is the minimum number of satellites required to determine the location.

Factors other than a satellite's proximity to an obstruction region may also be used to determine whether delay measurements based on signals from that satellite are prone to multipath error. For example, three dimensional effects may be considered. If a satellite with a direct line of sight to handheld GNSS device 100 is located 180 degrees from a large obstruction region, signals from the satellite may reflect off the structure represented by the obstruction region. Despite getting a direct signal from the satellite, handheld GNSS device 100 may also receive a reflected signal which may cause multipath error. In this example, based on the predicted source of reflected signals off the obstruction region, the satellite may be added to the suspect satellite list.

In one example, whether a satellite is consider suspect may be determined based on whether the satellite has a probability of multipath error being above some multipath threshold. The probability of a satellite having multipath error above the threshold may be determined based on the positional factors discussed above (e.g., distance to obstruction regions or three dimensional affects), other factors, or a combination of factors. The threshold may be determined, for example, by computer simulations of handheld GNSS device 100 in a multipath environment.

In yet another example, based on the obstruction data from step 508, display 112 of handheld GNSS device 100 may provide an indication that the user should move the device to a different location to reduce multipath error.

Figure 11:
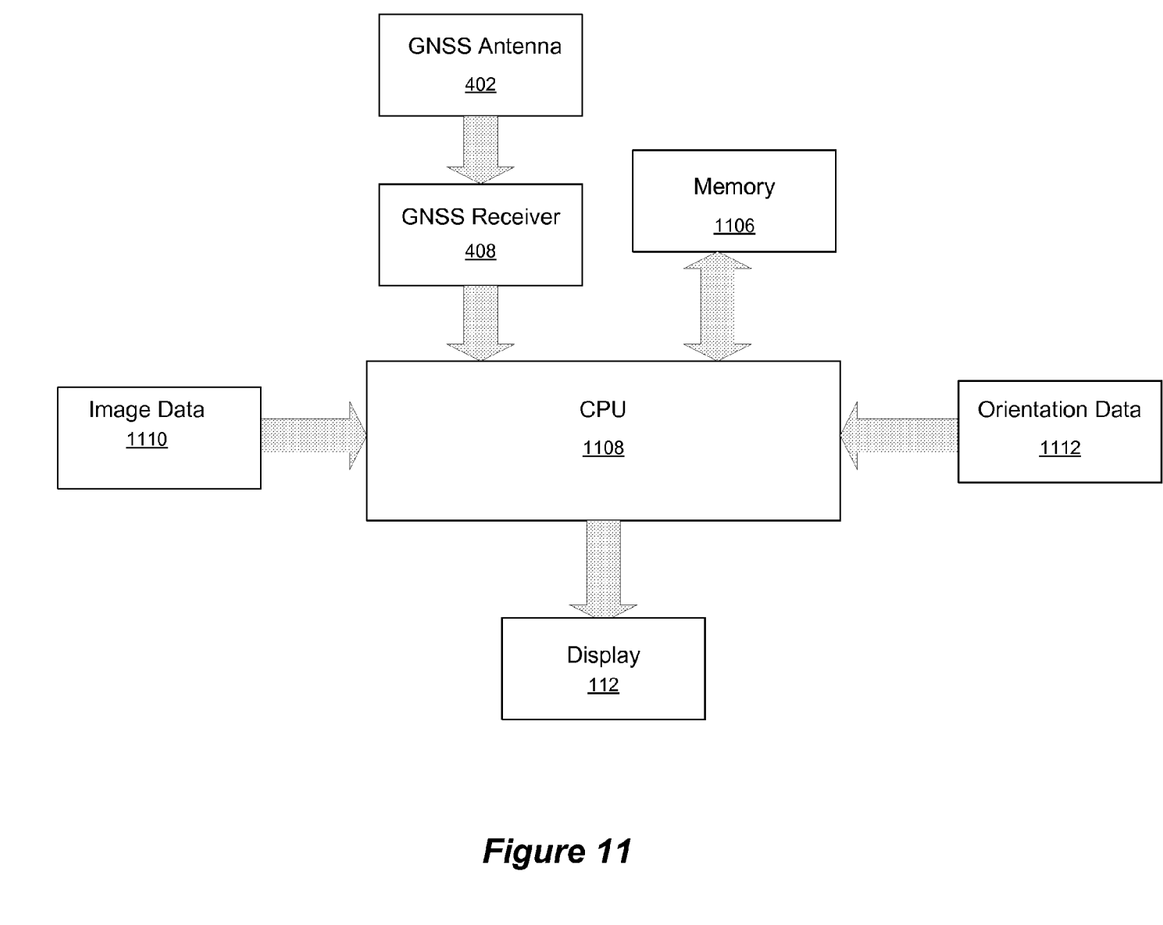
FIG. 11 illustrates a logic diagram showing the relationships between the various components of a handheld GNSS device according to embodiments of the invention.

FIG. 11 illustrates an exemplary logic diagram showing the relationships between the various components of handheld GNSS device 100. In one example, GNSS antenna 404 may send position data received from GNSS satellites to receiver 408. Receiver 408 may convert the received GNSS satellite signals into Earth-based coordinates, such as WGS84, ECEF, ENU, and the like. GNSS receiver 408 may further send the coordinates to CPU 1108 for processing along with other data. Orientation data 1112 may include pitch data from pitch horizon sensors and roll data from roll horizon sensors, for example. Image data 1110 from video or still camera may also be sent along to the CPU 1108 with the position data received by the GNSS antenna 402, positioning assistance data received by communication antenna 106, and orientation data 1112. Distance data from a distance sensor may also be used by CPU 1108. CPU 1108 processes the data to determine the position of the point of interest marker and provides display data to be displayed on display 112. CPU 1108 may store or retrieve data from memory 1106. For example, image data and associated orientation data may be stored in memory 1106 until a determining whether any GNSS satellites are obstructed from view. GNSS satellite location data may also be stored in memory 1106.

Figure 12:
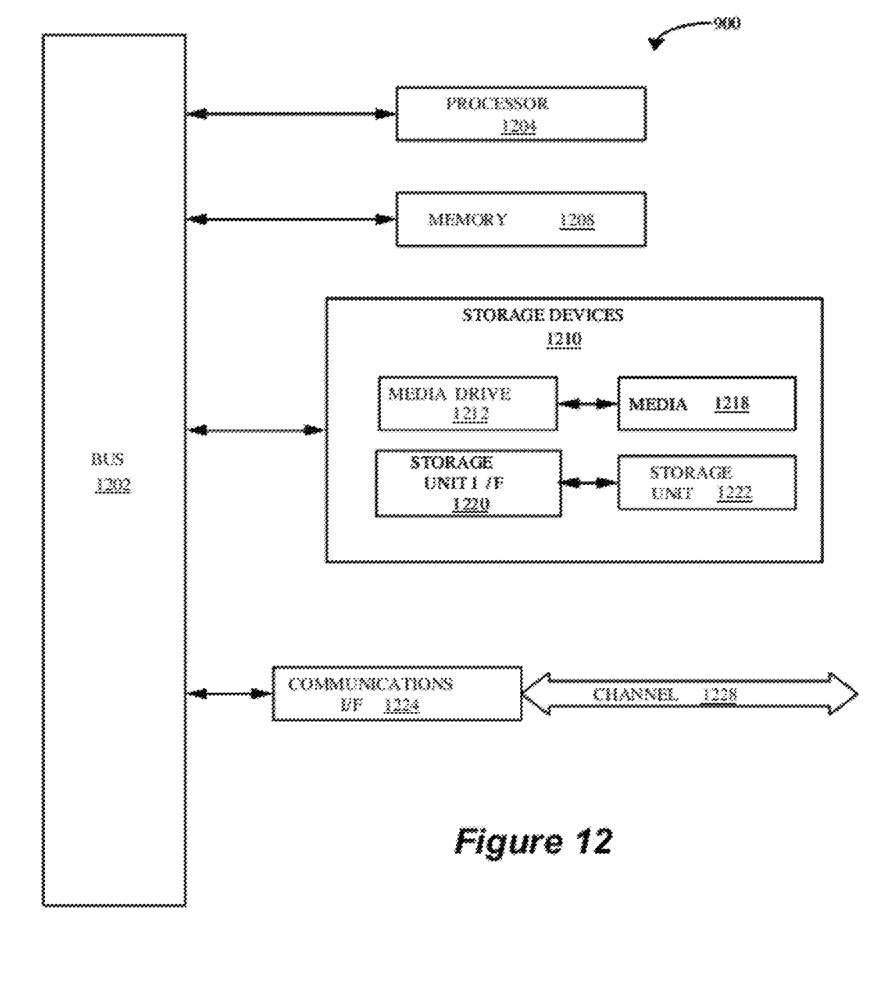
FIG. 12 illustrates a typical computing system that may be employed to implement some or all of the processing functionality in certain embodiments.

FIG. 12 illustrates an exemplary computing system 1200 that may be employed to implement processing functionality for various aspects of the current technology (e.g., as a GNSS device, receiver, CPU 1108, activity data logic/database, combinations thereof, and the like.). Components of computing system 1200 may be used to implement the steps of exemplary process 500. Those skilled in the relevant art will also recognize how to implement the current technology using other computer systems or architectures. Computing system 1200 may represent, for example, a user device such as a desktop, mobile phone, geodesic device, and so on as may be desirable or appropriate for a given application or environment. Computing system 1200 can include one or more processors, such as a processor 1204. Processor 1204 can be implemented using a general or special purpose processing engine such as, for example, a microprocessor, microcontroller or other control logic. In this example, processor 1204 is connected to a bus 1202 or other communication medium.

Computing system 1200 can also include a main memory 1208, such as random access memory (RAM) or other dynamic memory, for storing information and instructions to be executed by processor 1204. Main memory 1208 also may be used for storing temporary variables or other intermediate information during execution of instructions to be executed by processor 1204. Computing system 1200 may likewise include a read only memory ("ROM") or other static storage device coupled to bus 1202 for storing static information and instructions for processor 1204.

The computing system 1200 may also include information storage mechanism 1210, which may include, for example, a media drive 1212 and a removable storage interface 1220. The media drive 1212 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1218 may include, for example, a hard disk, floppy disk, magnetic tape, optical disk, CD or DVD, or other fixed or removable medium that is read by and written to by media drive 1212. As these examples illustrate, the storage media 1218 may include a computer-readable storage medium having stored therein particular computer software or data.

In alternative embodiments, information storage mechanism 1210 may include other similar instrumentalities for allowing computer programs or other instructions or data to be loaded into computing system 1200. Such instrumentalities may include, for example, a removable storage unit 1222 and an interface 1220, such as a program cartridge and cartridge interface, a removable memory (for example, a flash memory or other removable memory module) and memory slot, and other removable storage units 1222 and interfaces 1220 that allow software and data to be transferred from the removable storage unit 1222 to computing system 1200.

Computing system 1200 can also include a communications interface 1224. Communications interface 1224 can be used to allow software and data to be transferred between computing system 1200 and external devices. Examples of communications interface 1224 can include a modem, a network interface (such as an Ethernet or other NIC card), a communications port (such as for example, a USB port), a PCMCIA slot and card, etc. Software and data transferred via communications interface 1224. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 1208, storage media 1218, or removable storage unit 1222. These and other forms of computer-readable media may be involved in providing one or more sequences of one or more instructions to processor 1204 for execution. Such instructions, generally referred to as "computer program code" (which may be grouped in the form of computer programs or other groupings), when executed, enable the computing system 1200 to perform features or functions of embodiments of the current technology.

In an embodiment where the elements are implemented using software, the software may be stored in a computer-readable medium and loaded into computing system 1200 using, for example, removable storage drive 1222, media drive 1212 or communications interface 1224. The control logic (in this example, software instructions or computer program code), when executed by the processor 1204, causes the processor 1204 to perform the functions of the technology as described herein.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method for mitigating the effect of multipath error in a GNSS device, the method comprising:
   receiving signals from a plurality of GNSS satellites;
   receiving image data from at least one image sensor;
   receiving orientation data from at least one orientation sensor, wherein the orientation data comprises inclination data that describes a pitch and roll of the GNSS device with respect to a horizon;
   determining obstruction data based on the image data and the orientation data, wherein the obstruction data indicates an obstruction region;
   based on the obstruction data, the orientation data, and GNSS satellite location data, determining the position of at least one GNSS satellite of the plurality of GNSS satellites relative to the obstruction region, wherein the GNSS satellite location data describes the location of the at least one GNSS satellite;
   determining whether a satellite of the at least one GNSS satellite is an obstructed satellite if its position is within the obstruction region; and
   determining the location of the GNSS device based on the signals from the plurality of GNSS satellites, wherein measurements based on signals from obstructed satellites are excluded or de-weighted relative to measurements based on other satellites of the plurality of GNSS satellites.

2. The method of claim 1, wherein the orientation data further comprises magnetic direction data that describes the magnetic direction that the GNSS device is pointing.

3. The method of claim 1, further comprising:
   determining whether a satellite of the at least one GNSS satellite is a suspect satellite if its position relative to the obstruction region corresponds to a multipath error higher than a multipath threshold, wherein determining the location of the GNSS device further includes excluding or de-weighting signals from suspect satellites.

4. The method of claim 1, wherein the image data is a combination of image data received from the image sensor at different orientations.

5. A non-transitory computer readable storage medium storing computer executable instructions for:
   receiving signals from a plurality of GNSS satellites;
   receiving image data from at least one image sensor;
   receiving orientation data from at least one orientation sensor, wherein the orientation data comprises inclination data that describes a pitch and roll of a GNSS device with respect to a horizon;
   determining obstruction data based on the image data and the orientation data, wherein the obstruction data indicates an obstruction region;
   based on the obstruction data, the orientation data, and GNSS satellite location data, determining the position of at least one GNSS satellite of the plurality of GNSS satellites relative to the obstruction region, wherein the GNSS satellite location data describes the location of the at least one GNSS satellite;
   determining whether a satellite of the at least one GNSS satellite is an obstructed satellite if its position is within the obstruction region; and
   determining the location of the GNSS device based on the signals from the plurality of GNSS satellites, wherein measurements based on signals from obstructed satellites are excluded or de-weighted relative to measurements based on other satellites of the plurality of GNSS satellites.

6. The non-transitory computer readable storage medium of claim 5, wherein the orientation data further comprises magnetic direction data that describes the magnetic direction that the GNSS device is pointing.

7. The non-transitory computer readable storage medium of claim 5, further storing computer executable instructions for:
   determining whether a satellite of the at least one GNSS satellite is a suspect satellite if its position relative to the obstruction region corresponds to a multipath error higher than a multipath threshold, wherein determining the location of the GNSS device further includes excluding or de-weighting signals from suspect satellites.

8. The non-transitory computer readable storage medium of claim 5, wherein the image data is a combination of image data received from the image sensor at different orientations.

9. A GNSS device for mitigating the effect of multipath error, the GNSS device comprising:
- at least one antenna configured to receive signals from a plurality of GNSS satellites;
- at least one image sensor configured to generate image data;
- at least one orientation sensor configured to generate orientation data, wherein the orientation data comprises inclination data that describes a pitch and roll of the GNSS device with respect to a horizon; and
- a processor configured to:
  - determine obstruction data based on the image data and the orientation data, wherein the obstruction data indicates an obstruction region;
  - based on the obstruction data, the orientation data, and GNSS satellite location data, determine the position of at least one GNSS satellite of the plurality of GNSS satellites relative to the obstruction region, wherein the GNSS satellite location data describes the location of the at least one GNSS satellite;
  - determine whether a satellite of the at least one GNSS satellite is an obstructed satellite if its position is within the obstruction region; and
  - determine the location of the GNSS device based on the signals from the plurality of GNSS satellites, wherein measurements based on signals from obstructed satellites are excluded or de-weighted relative to measurements based on other satellites of the plurality of GNSS satellites.

10. The GNSS device of claim 9, wherein the orientation data further comprises magnetic direction data that describes the magnetic direction that the GNSS device is pointing.

11. The GNSS device of claim 9, wherein the processor is further configured to determine whether a satellite of the at least one GNSS satellite is a suspect satellite if its position relative to the obstruction region corresponds to a multipath error higher than a multipath threshold, wherein determining the location of the GNSS device further includes excluding or de-weighting signals from suspect satellites.

12. The GNSS device of claim 9, wherein the image data is a combination of image data received from the image sensor at different orientations.

* * * * *